United States Patent
Broberg

(10) Patent No.: US 7,765,551 B2
(45) Date of Patent: Jul. 27, 2010

(54) SYSTEM FOR DYNAMICALLY LOADING APPLICATION RESOURCES FROM THE FIRST SERVER TO THE SECOND SERVER BASED ON THE MODIFIED APPLICATION RESOURCES FROM THE FIRST SERVER

(75) Inventor: Jeffrey Broberg, Barnstable, MA (US)

(73) Assignee: Novell, Inc., Provo, UT (US)

( * ) Notice: Subject to any disclaimer, the term of this patent is extended or adjusted under 35 U.S.C. 154(b) by 1118 days.

(21) Appl. No.: 10/361,264

(22) Filed: Feb. 10, 2003

(65) Prior Publication Data

US 2004/0158602 A1    Aug. 12, 2004

(51) Int. Cl.
G06F 9/46 (2006.01)
G06F 17/00 (2006.01)

(52) U.S. Cl. ...................... 718/104; 707/610

(58) Field of Classification Search .......... 718/104; 707/204, 203, 2, 610; 719/318; 709/203
See application file for complete search history.

(56) References Cited

U.S. PATENT DOCUMENTS

| | | | | |
|---|---|---|---|---|
| 5,922,054 | A * | 7/1999 | Bibayan | 719/328 |
| 5,930,824 | A * | 7/1999 | Anglin et al. | 711/162 |
| 6,065,051 | A * | 5/2000 | Steele et al. | 709/219 |
| 6,460,055 | B1 * | 10/2002 | Midgley et al. | 707/204 |
| 6,571,388 | B1 * | 5/2003 | Venkatraman et al. | 717/166 |
| 6,789,211 | B2 * | 9/2004 | Phillips | 714/5 |
| 6,981,005 | B1 * | 12/2005 | Cabrera et al. | 707/203 |
| 6,993,771 | B1 * | 1/2006 | Hasha et al. | 719/318 |
| 7,117,243 | B2 * | 10/2006 | Peart | 709/203 |
| 7,149,730 | B2 * | 12/2006 | Mullins et al. | 707/2 |
| 7,370,281 | B2 * | 5/2008 | Weber | 715/769 |
| 2001/0042073 | A1 * | 11/2001 | Saether et al. | 707/203 |
| 2010/0076876 | A1 * | 3/2010 | Brady et al. | 705/31 |

* cited by examiner

*Primary Examiner*—Meng-Ai An
*Assistant Examiner*—Camquy Truong
(74) *Attorney, Agent, or Firm*—Pillsbury Winthrop Shaw Pittman LLP

(57) ABSTRACT

Among other embodiments set forth herein, there is provided, in a network system including a first server running a first application and a second server running a second application, the second server being remote from the first server, each of the first and second server further including a set of application resources associated therewith, a method for dynamically loading application resources from the first server to the second server, the method comprising the steps of: generating and dispatching a monitoring mechanism from the first server to the second server; in accordance with a predefined criteria (such as the expiration of a certain time interval), i) comparing the application resources of the first server and the second server to determine whether the application resources associated with the first server has been modified; and ii) based on the determination, dynamically loading the modified application resources from the first server to the second server.

27 Claims, 4 Drawing Sheets

SYSTEM FOR DYNAMICALLY LOADING APPLICATION RESOURCES FROM THE FIRST SERVER TO THE SECOND SERVER BASED ON THE MODIFIED APPLICATION RESOURCES FROM THE FIRST SERVER

STATEMENT REGARDING FEDERALLY SPONSORED RESEARCH OR DEVELOPMENT

Not applicable.

BACKGROUND

1. Field of the Invention

The present invention relates generally to data processing techniques and more particularly, to a mechanism for generating and populating one or more repositories of application resources for use in integrated enterprise systems. An embodiment of the present invention is implemented in the Java™ programming language 2. Description of Related Art Sun Microsystems' Java 2 Platform, Enterprise Edition (J2EE) is a set of component technologies (Enterprise Java-Beans™, JavaServer Pages™, and servlets) that simplify the process of developing enterprise applications. The J2EE platform provides a number of system-level services that simplify application programming and allow components to be customized to use resources available in the environment in which they are deployed. In conjunction with the component technologies, the J2EE platform provides APIs that enable components to access a variety of remote services, and mechanisms for communication between clients and servers and between collaborating objects hosted by different servers.

Numerable sources exist describing the J2EE application architecture. A book entitled "Designing Enterprise Applications for the Java 2 Platform, Enterprise Edition" by Sun Microsystems, which is incorporated herein by reference, discloses how to build J2EE applications and use the J2EE technology. Additional reference materials are also available.

The J2EE platform is intended for experimentation and supports iterative development. However, whenever a developer makes a change to a J2EE application, the developer must tediously redeploy the application to effectuate the changes.

SUMMARY OF THE PRESENT INVENTION

The present innovation is a distinctive solution for providing, among other things, productive dynamic resource loading to a J2EE server thereby avoiding frequent redeployments whenever changes are made to a J2EE application. Specifically, the present solution utilizes an innovative J2EE containment mechanism to facilitate, among other things, the modification of rules, workflows, images, XML, Java classes, etc., without redeployment during development. Thus, instantaneous modifications to a running J2EE application are realized.

Therefore, in accordance with one aspect of the present invention, there is generally provided, in a network system including a first server running a first application and a second server running a second application, the second server being remote from the first server, each of the first and second server further including a set of application resources associated therewith, a method for dynamically loading application resources from the first server to the second server, the method comprising the steps of: generating and dispatching a monitoring device from the first server to the second server; in accordance with a predefined criteria (such as the expiration of a certain time interval), i) comparing the application resources of the first server and the second server to determine the application resources of the first server and the second server to determine whether the application resources associated with the first server has been modified; and ii) based on the determination, dynamically loading the modified application resources from first server to the second server.

The above-mentioned aspect(s) and other aspects, features and advantages of the present invention will become better understood with regard to the following description, appended claims, and accompanying drawings.

BRIEF DESCRIPTION OF THE DRAWING(S)

Referring briefly to the drawings, embodiments of the present invention will be described with reference to the accompanying drawings in which.

DETAILED DESCRIPTION OF THE PRESENT INVENTION

Figure 1:
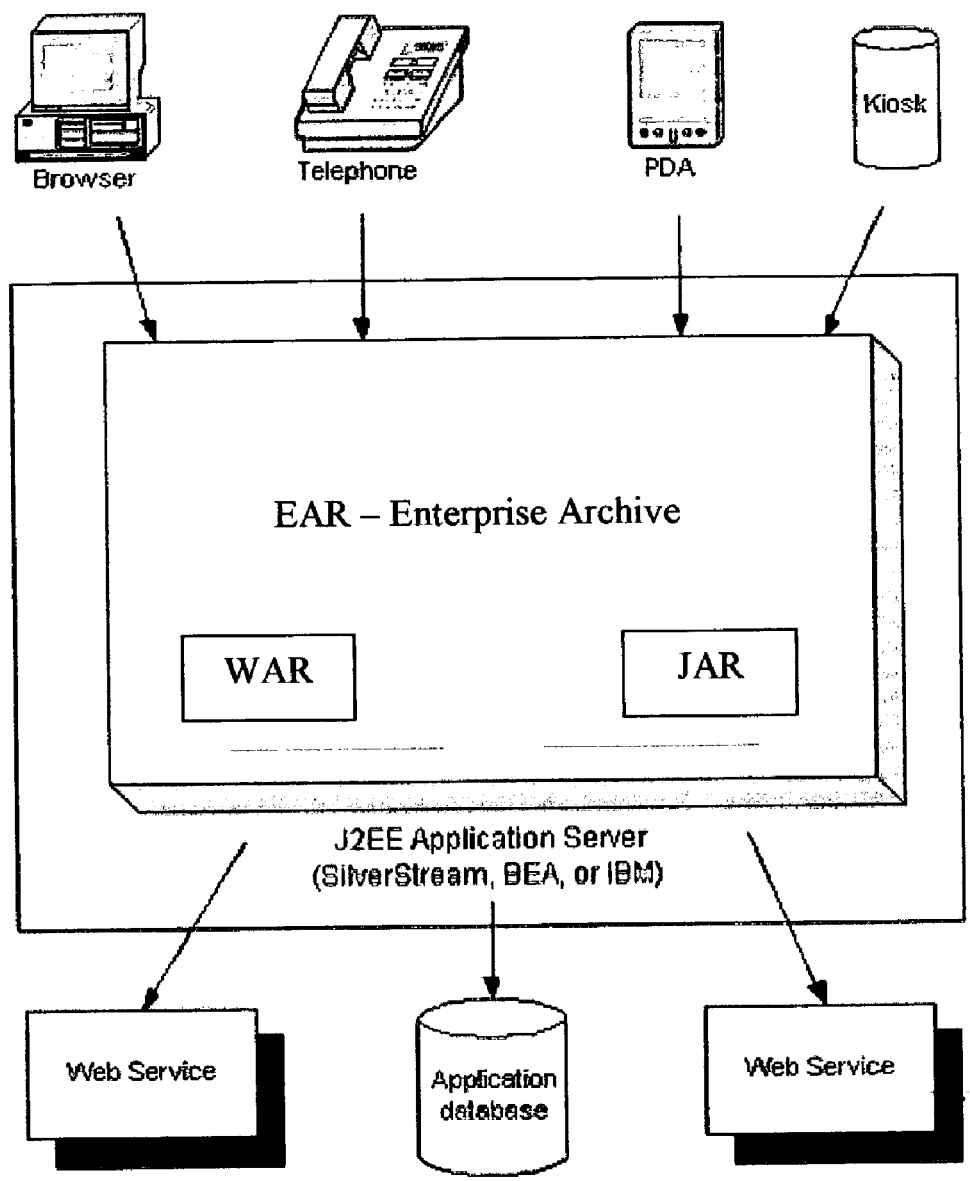
FIG. 1 illustrates a system constructed in accordance with the teachings expressed herein wherein a Resource Set is deployed.
Figure 2:
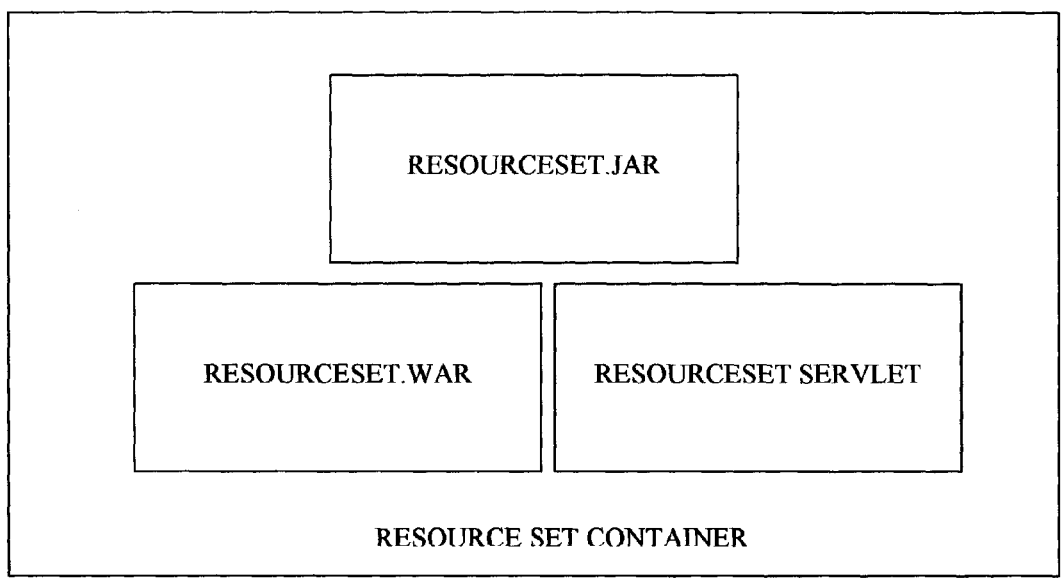
FIG. 2 is a block diagram of an exemplary embodiment of a Resource Set container in accordance with the teachings expressed herein.
Figure 3:
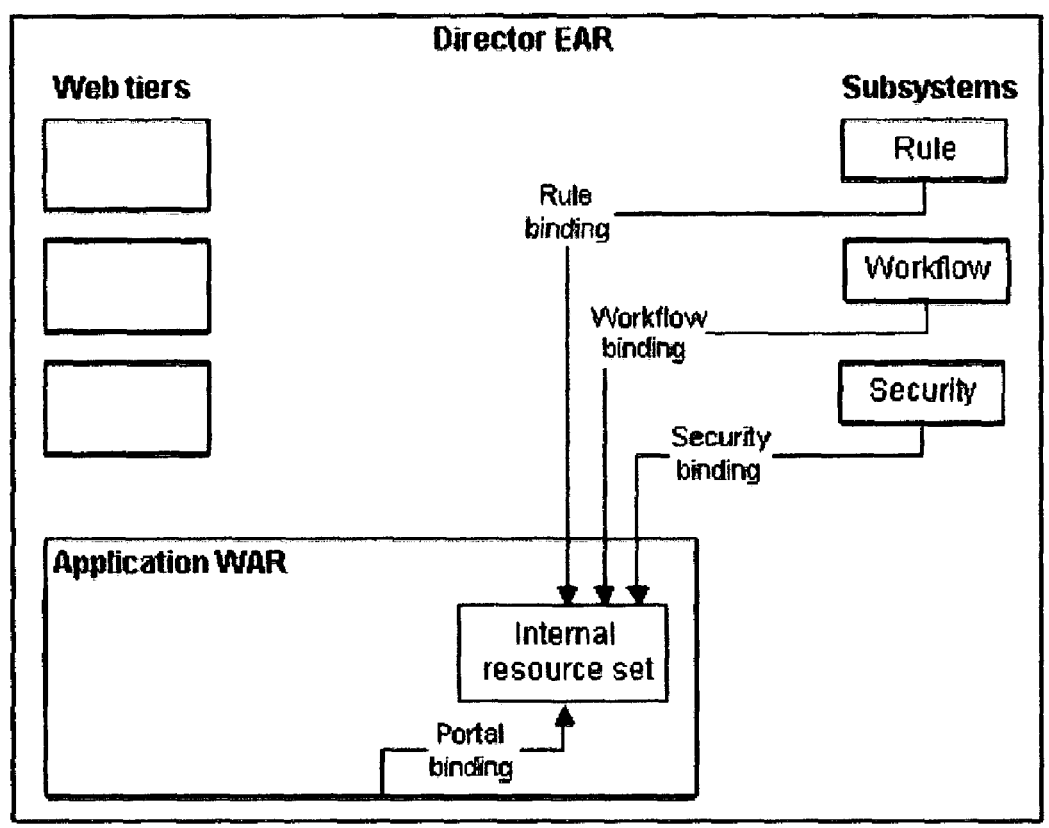
FIGS. 3-4 illustrate exemplary design patterns for a Resource Set in accordance with the teachings expressed herein.

Referring more specifically to the drawings, for illustrative purposes the present invention is embodied in the system configuration, method of operation and application code, generally shown in FIGS. 1-3. Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

It will be appreciated that the system, method of operation and product described herein may vary as to the details without departing from the basic concepts disclosed herein. Moreover, numerous specific details are set forth in order to provide a more thorough description of the present invention. However, all specific details may be replaced with generic ones. Furthermore, well-known features have not been described in detail so as not to obfuscate the principles expressed herein. While exemplary embodiments of the present invention described herein is specifically directed to the Java-based development environment, the invention is not limited thereby as one skilled in the art can readily adapt the concepts presented herein to a preferred development environment. Therefore, other programming languages, platforms and architectures, etc. fall within the scope of the present invention.

Overview—Resource Set

In accordance with the present solution, a Resource Set is provided enabling a J2EE application to effectively manage, categorize and index J2EE artifacts or application resources particularly those artifacts and resources that may not be stored in an integrated database or defined in the configuration and service elements for service subsystems of a J2EE application. More specifically, the Resource Set organizes descriptors and other files used by J2EE subsystems and provides for dynamic loading during development thereby avoiding frequent redeployments thus speeding up testing.

A Resource Set holds application-defined resources and classes. Some of these resources are templates or definitions for using a subsystem's features, such as a rule or a component descriptor. Others specify how subsystems work together, such as bindings between rules and users. Resources are usually XML files; some are accompanied by Java classes. Thus, resources may encompass: 1) categories, 2) components, 3) data, 4) data definitions and device profiles. 5) style sheets, 6) classes; 7) rules, 8) custom conditions and actions, 9) security roles and 10) workflow processes and so forth. Resource Sets can be either public or private to protect resources that should remain constant for all deployments.

In one embodiment, the Resource Set organizes the application's resources in a known directory structure. In the J2EE application, access to resources is handled by a Resource Set servlet.

The Resource Set runs on a J2EE server as part of the middle tier. Configuration of a Resource Set is done via a EboResourceMeta structure. The EboResourceMeta structure is a central point of control for all meta-definition information that a Resource Set needs to execute and establishes a 1-to-1 relationship between a Resource Set and a ResourceSetMeta object. Thus, every ResourceSet has an associated ResourceSetMeta.

In operation, a J2EE application uses one or more Resource Sets (within the same EAR file or elsewhere) to locate application resources. In carrying out its intended functions, a Resource Set provides for, among other things: 1) document discovery and retrieval, 2) class discovery and 3) class loading.

Application Server Support

Resource Sets constructed in accordance with the present solution run on data processing machines and more particularly, networked server machines configured for the J2EE application architecture, including such conventional names as the BEA Weblogic 6.1, IBM WebSphere 4.0 AE and SilverStream exteNd Application Server 3.7.4 machines. FIG. 1 is a block diagram of one embodiment of a networked system constructed in accordance with the teachings expressed herein.

Resource Set—An Exemplary Embodiment

As shown in FIG. 2, a Resource Set container includes a ResourceSet.war, a Resource servlet and a ResourceSet.jar. Each of the foregoing will now be defined in the following sections.

ResourceSet.war

Figure 4:
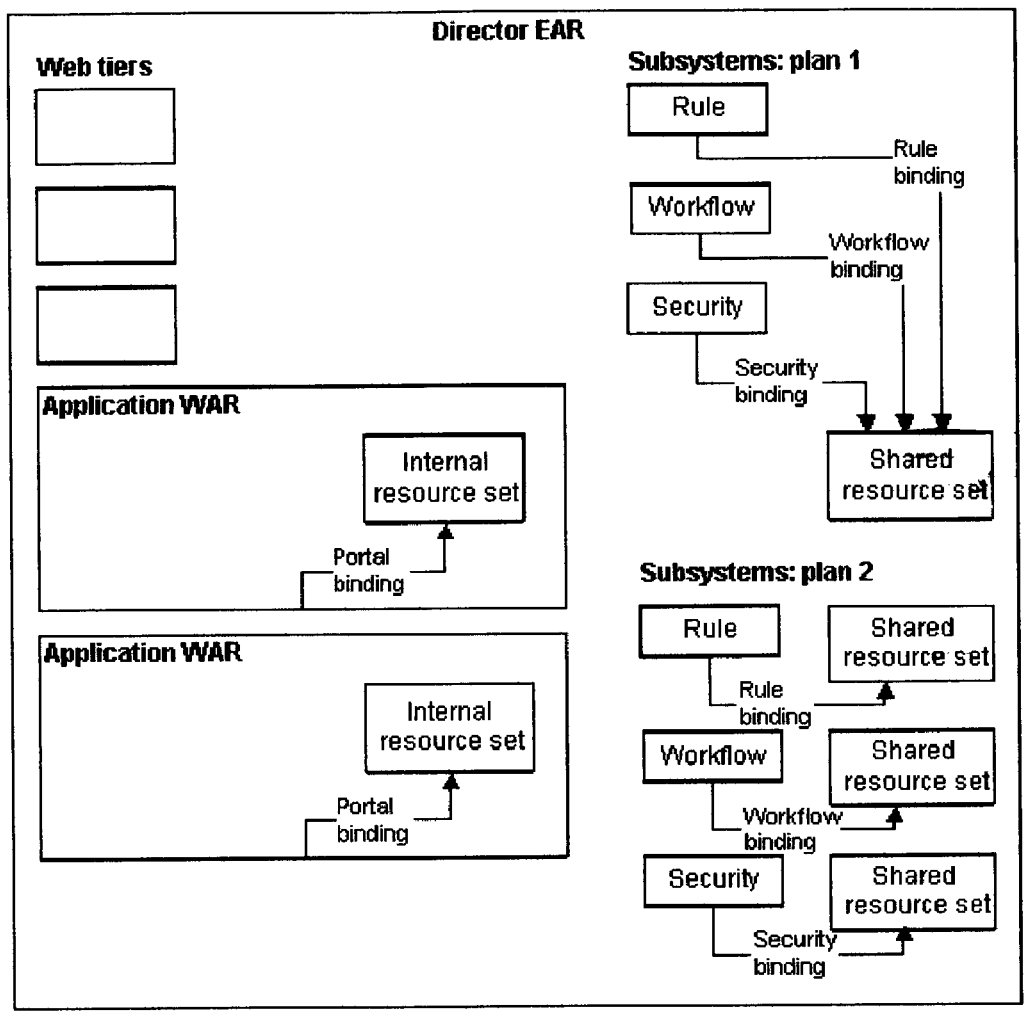

As shown in FIGS. 3-4, exemplary ResourceSet.war design patterns include: 1) internal and 2) shared.

Internal

An internal ResourceSet.WAR file is contained within the same WAR as the application code. The application WAR is configured with a Resource Set servlet. This design pattern is applicable when it is desirable to generate a self-contained WAR that keeps application functionality (JSP pages, servlets, and Java classes) together with application resources.

Shared

A shared Resource Set is not contained with an application WAR and which can be accessed by one or more application WARs within an EAR. A shared Resource Set contains application resources only. This design pattern is particularly useful when the EAR contains more than one application WARs and resources need to be available in a common place for subsystem binding. A subsystem can bind to only one Resource Set, thus resources handled by that subsystem should not be distributed among several Resource Sets.

Remote

A remote ResourceSet.war (not shown) is located outside of and deployed separately from an EAR file, either in another EAR or a standalone WAR. The remote ResourceSet.war can be on the same or another server and more than one J2EE EAR can access the Resource Set using its URL.

A remote Resource Set is utilized when resources need to be available for several EARs or when it is desirable to maintain resources in a separately deployed archive. Application resources are/may be accessed via function calls and messaging requests, for example, native API function calls, Simple Object Access Protocol (SOAP) requests and Hypertext Transfer Protocol (HTTP) GET requests. The application.xml file for the EAR should contain a Web module entry for each Resource Set created.

Resource Servlet

In carrying out its intended function, the ResourceSet.war file uses a servlet called Resource of class type EboResourceSet. The EboResourceSet class is the central coordinator for all services associated with Resource Sets. Some associated methods include destroy( ); doGet( ); getDirectoriesXML( ); getDirectoryXML; getElement( ); getElementBytes( ); and init( ) etc.

The initialization parameters for the Resource Servlet are described below:

Name: this parameter identifies the ResourceSet.war.

ResourcePath: this parameter specifies the path for document discovery and retrieval. The path can include JAR entries as well as disk locations. The resource path is processed from left to right. If the same object exists in multiple locations, the last one is used.

LibPath: this parameter specifies the path for Java class discovery. The path can include JAR entries as well as disk locations. The lib path is processed from left to right. If the same object exists in multiple locations, the last one is used.

Proxy: this parameter indicates whether this Resource Set.war is a proxy for a remote ResourceSet.war. Possible values are true or false.

URI: this parameter specifies the SOAP URI for the ResourceSet.war. The SOAP URI is used when you access a ResourceSet.war deployed outside an EAR file.

An EAR file that accesses a remote ResourceSet.war is associated with a proxy Resource.Set.war that registers the URI for the remote ResourceSet.war as its own. Once this is accomplished, any references to the URI of the proxy Resource Set.war returns the URI for the remote ResourceSet.war, rather than the local one. This indirection allows SOAP requests to be handled by the correct remote ResourceSet.war.

Vulture Interval: this parameter is set to a desired time interval. If the resourcePath or libPath entries in the web.xml (descriptor file of the ResoureSet.war) file contain disk locations, and the vulture interval is greater than zero, a Vulture is placed on each disk directory. A Vulture watches disk locations for modifications. When the Vulture Interval is reached, the Vulture checks to see if any of the files within the directory have been modified. The Vulture also checks for new files. Deleted files are not processed. When the Vulture finds new or changed files in a disk location, it loads these files into cache.

Once an item has been loaded into cache, it is not removed until the next time the server is started, or the next time the WAR is deployed.

Verbose: this parameter specifies the logging level for the Resource Set. Possible values are true and false.

The following pseudo-code listing sets forth relevant portions of an exemplary deployment descriptor XML file of a ResourceSet.war, namely, the deployment settings of the Resource servlet and the servlet mappings of the Vulture servlet.

```
...
<web-app>
<display-name>ResourceSet</display-name>
<servlet>
<servlet-name>resource</servlet-name>
<servlet-class>com.sssw.fw.resource.EboResourceServlet
</servlet-class> //name
of class package containing the EboResourceServlet class
//initialtization of parameters
<init-param>
<param-name>name</param-name>
<param-value>ResourceSet</param-value>
</init-param>
<init-param>
<param-name>resourcePath</param-name>
<param-value>
WEB-INF/lib/core_components.jar; //path 1
WEB-INF/lib/sample_components.jar; //path 2
WEB-INF/lib/resource.jar;data; //path 3
WEB-INF/lib/rss_components.jar //path 4
</param-value>
</init-param>
<init-param>
<param-name>libPath</param-name>
<param-value>
WEB-INF/lib/resource.jar;
WEB-INF/lib/core_components.jar;
WEB-INF/lib/sample_components.jar;
WEB-INF/lib/RuleCA.jar;build/resource-classes;
WEB-INF/lib/rss_components.jar</param-value>
</init-param>
<init-param>
<param-name>proxy</param-name>
<param-value>false</param-value>
</init-param>
<init-param>
<param-name>uri</param-name>
<param-value>
http://localhost/dbName/nameSpace/ResourceSet/resource
</param-value>
</init-param>
<init-param>
<param-name>vultureInterval</param-name>
<param-value>7500</param-value>
</init-param>
<init-param>
<param-name>verbose</param-name>
<param-value>false</param-value>
</init-param>
<load-on-startup>1</load-on-startup>
</servlet>
<servlet>
<servlet-name>vulture</servlet-name>
<servlet-class>com.sssw.fw.resource.EboVultureServlet
</servlet-class>
</servlet>
<servlet-mapping>
<servlet-name>catalog</servlet-name>
<url-pattern>/catalog</url-pattern>
</servlet-mapping>
<servlet-mapping>
<servlet-name>resource</servlet-name>
<url-pattern>resource</url-pattern>
</servlet-mapping>
<servlet-mapping>
<servlet-name>resource</servlet-name>
```

-continued

```
<url-pattern>resource/*</url-pattern>
</servlet-mapping>
<servlet-mapping>
<servlet-name>vulture</servlet-name>
<url-pattern>vulture</url-pattern>
</servlet-mapping>
...
```

Resource.jar

When creating a custom Web application that includes a Resource Set, a WAR file contains the Resource Set servlet and a JAR file ("appname-resource.jar", here resource.jar) contains directories for the resources required by the J2EE application. In the deployed EAR, the resource JAR is in the WEB-INF/lib directory of the WAR for the custom Web application.

The Resource.jar file contains one or more application resources including, for example, Java classes for components, conditions, and actions, XML descriptor files that provide application metadata and user defined custom resources.

In addition to appname-resource.jar, other JAR files may be added to WEB-INF/lib. Any resources in those additional JARs must be stored in the subdirectory that corresponds with the resource type. Each JAR needs to be listed in the resourcePath and/or libPath in the Resource Set's configuration file.

In an exemplary embodiment of the present invention, the resource JAR is organized as a directory structure. For example, the following table lists directories that may be part of a resource JAR and the types of resources contained therein.

| Resource subdirectory | Purpose of Resources |
| --- | --- |
| views | Search queries for changing the current set of files as the application is developed. |
| category | Label for categorizing components and pages. |
| component | Component descriptors, which provide configuration information for component classes. |
| data-definition | Wireless configuration information. |
| device-profile | Definitions of user environments. Used in data-definition and style resources. |
| layout | Descriptors and definitions of the way a page arranges components on a page. |
| option | Descriptors for action items that can be included in the title bars of components. |
| page | PID definitions, which are pages that contain component tags and are processed by the portal servlet. |
| style | styles (XSL) and style descriptors (XML). |
| theme | Subdirectories that contain files that define the visual characteristics to be applied across a portal application. |
| rule | Rule definitions. |
| rule-action-macro | Action macro definitions. |
| rule-condition-macro | Condition macro definitions. |
| rule-group-binding | Associations between rules and groups. |
| rule-pipeline | Pipeline definitions. |
| rule-pipeline-binding | Associations between rules and pipelines. |
| rule-user-binding | Associations between rules and users. |
| security-role | Associations between roles and users. |
| workflow-activity-policy | URL representing the page or component to open for a workitem. |
| workflow-process | Definition of a workflow process. |
| custom-directory-name | Additional directories that contain Java classes or custom resources. |

Subsystems

Binding Subsystems to a Resource Set

Subsystems that use Resource Sets are bound to them by entries in the following XML files: a) resourceset.xml in the WEB-INF/conf directory of a WAR and b) config.xml for the subsystem service JAR The resourceset.xml file specifies a name that other modules use to refer to the Resource Set. This name can be modified by editing the value of the appropriate setting parameter:

```
<settings>
    <name>customwebappname-ResourceSet</name>
    ...
</settings>
```

For a subsystem that uses resources, its config.xml file binds the subsystem to a particular Resource Set by specifying the Resource Set name in a property key/value pair. The binding for the rule subsystem may look like this:

```
<property>
    <key>RuleService/resourceset</key>
    <value>customwebappname-ResourceSet</value>
</property>
```

Edit a Subsystem's config.xml

The config.xml file for subsystem that uses a resource set may be found in the location described in the following table.

| Subsystem or Web Tier | Location of config.xml |
| --- | --- |
| Rule | In Rule subsystem: /library/RuleService/RuleService-conf |
| Security | In Security subsystem: /library/SecurityService/SecurityService-conf |
| Workflow | In Workflow subsystem: /library/WorkflowService/WorkflowService-conf |
| Custom Web Application | In the WAR: WEB-INF/conf |

Configuring a Resource Set

A J2EE web application with a Resource Set has two configuration files: a) resourceset.xml and b) web.xml.

resourceset.xml

The resourceset.xml configuration file has settings that specify how to find resources and what JARs are enabled, as well as the variables used for setting values.

Variables

The variables section of resourceset.xml defines local variables that may be used when defining configuration settings, instead of static values. Variables may be used to identify whether a subsystem is installed and active and to identify directory paths. In a newly created Resource Set, several variables may be pre-defined. Additional variable definitions may also be added.

The variables section has the following exemplary XML format

```
<variables>
    <variable key="EARLOCATION" value=
    "C:\DirectorProjects\Test2\Ear" />
    <variable key="WARLOCATION"
value="C:\DirectorProjects\Test2\Ear\MyApp"/>
    <variable key="ACCESS_DISK" value="true" />
    <variable key="LIBRARY" value="../library" />
    <variable key="WEBINF" value="WEB-INF/lib" />
    <variable key="NEVER" value="0" />
    <variable key="FREQUENT" value="7500" />
    <variable key="INFREQUENT" value="15000" />
</variables>
```

The aforementioned variables are defined as follows:

| Variable | Typical value | Purpose |
| --- | --- | --- |
| EARLOCATION | drive:\project-directory\EAR | The path for the EAR in the project directory; useful for specifying disk locations in the resourcePath and libPath. |
| WARLOCATION | drive:\project-directory\EAR\appname | The path for the WAR that contains the resource set. |
| ACCESS_DISK | true | Whether resources and classes are being dynamically loaded from disk; should be coordinated with the vultures and dynamicClassLoading settings for more readable entries in resourcePath and libPath. |
| LIBRARY | ../library | The relative path to the library directory in the EAR, which contains all the subsystem JARs. |
| WEBINF | WEB-INF/lib | The relative path to the directory in the resource set WAR that contains resource JARs. |
| NEVER | 0 | Variable for setting an entry's vultureInterval attribute. |
| FREQUENT | 7500 | Variable for setting an entry's vultureInterval attribute. |
| INFREQUENT | 15000 | Variable for setting an entry's vultureInterval attribute. |

General Settings

General settings for the Resource Set include its name and flags that enable validation, logging, and dynamic loading. The settings section of resourceset.xml has the following exemplary format:

```
<settings>
    <name>appname-ResourceSet</name>
    <dynamicClassLoading>true</dynamicClassLoading>
    <validate>false</validate>
    <verbose>false</verbose>
    <vultures>true</vultures>
</settings>
```

The following table describes the general settings:

| Element | Typical Value | Purpose |
|---------|---------------|---------|
| name | appname-ResourceSet | A name for the resource set; used in other configuration files that need to refer to this resource set. |
| dynamicClassLoading | true or false | Whether Java classes are dynamically loaded when they are changed. The vultures setting must also be enabled |
| validate | true or false | Whether validation classes in the resource set should run when the resource set is loaded. Typically set to true during development and false in a deployed production application. |
| verbose | true or false | Whether log messages are reported to the server console. |
| vultures | true or false | Whether the resource set sets up processes to report changed files in disk locations in the resource set's paths. |

Types and Locations of Resources: resourcePath, libPath

The path-entries section of resourceset.xml specifies two paths: resourcePath and libPath.

resourcePath resourcePath tells the J2EE application where to find resources. For resourcePath, you specify:

a) What types of resources to load: a set of ext elements identify the file extensions associated with resource types.

b) Where to find resources: a set of entry elements identify JARs and disk locations that contain resources. Resources may be dynamically loaded from disk locations and reloaded when they change.

libPath

The libPath tells the application where to find Java classes. The resource set class loader looks for classes in particular locations and can dynamically load and replace classes that have been previously loaded. For libPath, you specify:

a) What classes are loaded via the normal class loader: a set of filter elements identify the packages that contain these classes, typically the packages of the J2EE API;

b) What file extensions identify Java code: typically just class;

c) Where to find Java code in JARs and disk locations: a set of entry elements identify JARs and disk locations that contain Java classes. Classes may be dynamically loaded from disk locations and reloaded when they change.

In one embodiment, classes to be loaded from disk locations should not be included in the EAR. When using dynamic classloading, artifacts that include the classes in the EAR are made inactive.

The path-entries section has the following exemplary XML format:

```
<path-entries>
    <resourcePath>
        <exts>
            <ext active="true">.xml</ext>
            ...
        </exts>
        <entries>
            <entry active="true">$WEBINF$/RuleCA.jar</entry>
            ...
            <entry active="!$vultures$">$WEBINF$/
                appname-resource.jar</entry>
            <entry active="$vultures$" vultureInterval=
                "$FREQUENT$"
                    recursive="true">$WARKLOCATION$/
                    data</entry>
            ...
        </entries>
    </resourcePath>
    <libPath>
        <filters>
            <filter active="true">com.sssw.fw</filter>
            ...
        </filters>
        <exts>
            <ext active="true">.class</ext>
        </exts>
        <entries>
            <entry active="true">$WEBINF$/CQA.jar</entry>
            ...
            <entry active="!$vultures$">$WEBINF$/
                appname-resource.jar</entry>
            <entry active="$vultures$" vultureInterval=
                "$FREQUENT$"
                    recursive="true">$WARLOCATION$/
                    build/resource-classes</entry>
            <entry active="!$productionMode$"
                vultureInterval="$FREQUENT$"
                    recursive="true">$DISKLOCATION$/
                    ResourceSet/WEB-
INF/lib</entry>
        </entries>
    </libPath>
</path-entries>
```

The following table describes the elements in the path-entries section:

| Element | Purpose |
|---------|---------|
| resourcePath | Container for extensions and entries elements that specify what resources to load and where to find them. |
| libPath | Container for filters, extensions, and entries elements that specify what Java classes to load and where to find them. |
| filter | Specifies a class or package containing classes that the normal class loader loads, including classes of the J2EE API. Individual filter elements are contained in a filters container element. If the active attribute is false, the item is ignored. Example: <filter active="true">com.sssw.fw</filter> |
| ext | Specifies a file extension that identifies what files to load from locations on the resourcePath or libPath. Individual ext elements are contained in an extensions container element. If the active attribute is false, the item is ignored. |

-continued

| Element | Purpose |
|---------|---------|
|  | Example:<br><ext active="true">.xml</ext> |
| entry | Specifies a JAR or disk location where resources or Java classes are found. It is typical to use variables to identify locations within the J2EE EAR. Individual entry elements are contained in an entries container element.<br>The element's data value is a path:<br>For JARs, the path is the location of a Java archive in the resource set WAR.<br>For disk locations, the path should be the location of the files in the source layout view of the EAR project.<br>Order of entries The entry elements are scanned from last to first. If duplicate resources or classes exist, the location listed last is the one that gets used. However, if a class is in the EAR but also on disk, the class in the EAR is always used.<br>Attributes If the active attribute is false, the item is ignored.<br>Additional attributes that apply when the entry is a disk location and dynamic loading is enabled are:<br>vultureInterval Milliseconds between scans for updated classes or resources<br>recursive Whether subdirectories are included<br>Examples:<br><entry active="true">$WEBINF$/CQA.jar</entry><br><entry active="true">$WEBINF$/resource.jar</entry><br><entry active="true" vultureInterval="$FREQUENT$" recursive="true">$WARLOCATION$/data</entry><br><entry active="true" vultureInterval="$FREQUENT$" recursive="true">$WARLOCATION$build/resource-classes</entry> |

Using Variables in Entry Elements

Several useful variables may be pre-defined in the variables section, including the disk location of the EAR and WAR. General settings may also be used as variables. Further, additional variables may be defined as needed to make the resource.xml dynamically configurable.

EXAMPLES

The following three examples illustrate the foregoing principles.

Ex. 1

<entry active="true">$WEBINF$/resource.jar</entry>

The above entry refers to the resource.jar in the resource set. $WEBINF$ specifies the WEB-INF/lib directory of the resource set WAR.

Ex. 2

<entry active="true" vultureInterval="$FREQUENT$" recursive="true">$WARLOCATION$/build/resource-classes</entry>

The above entry refers to a disk location within the J2EE project directory where Java classes are compiled. A vulture interval has been set—so as items are recompiled, they will be dynamically loaded.

Ex. 3

<entry active="$vultures$" vultureInterval="$FREQUENT$"recursive="true">$WARLOCATION$/data</entry>

The above entry refers to the disk location where resources are stored in the WAR. The subdirectories will all be searched recursively—and as resources change, they will be dynamically loaded.

Directory Structure

Directory Keys

Files in the resource JARs and disk locations may be indexed by their file names. For each of the standard resource set directories, resourceset.xml can define additional ways of categorizing the resources or classes. Additional search indexes may be defined, and indexes for custom directories in the resource set may be added. Indexing and searching are features that enhance the developer's work environment; they are not used in the deployed Resource Set application.

The directories section has this exemplary XML format:

```
<directories>
    <directory name="rule-condition-macro" active="true">
        <search key="name" valuebased="true"
            xpath="/conditionmacro[@name]"
    active="true" />
    </directory>
    ...
</directories>
```

The following table describes the elements contained in the directories section:

| Directory setting | Typical value | Purpose and attributes |
|---|---|---|
| directory | <directory name="rule-condition-macro" active="true"> | The directory for which you want to add indexes. There can be a directory entry for any directory that occurs in any of the JARs or disk locations in the path-entries section.<br>Attributes are:<br>name The name of the directory to be indexed.<br>active Whether this directory should be indexed. For efficient performance, set to false when the appropriate subsystem is not loaded. |

| Directory setting | Typical value | Purpose and attributes |
|---|---|---|
| search | <search key="name" valuebased="true" xpath="/conditionmacro [@name]" active="true" /> | A definition for a secondary index for the directory. There can be one or more search indexes for a directory. The file name of the resource or class is always the primary index.<br>Attributes are:<br>key A keyword naming the index. The user would be able to choose this type of search in the Resources Pane.<br>valuebased Whether the index should note the presence of the value of an element or attribute.<br>xpath An expression, using XPath syntax, specifying what to index.<br>active Whether this index should be created. |

Directory Directives

Directory Directives define the directory structures that should be indexed, and potentially multi-indexed based on xpath expressions. The directories analyzed are defined by the resourcePath and libPath settings. By default, all directories under the control of a Resource Set are indexed by the file name of the artifact within the directory. The file name is considered the "primary key". All items under control of the Resource Set are always indexed in this manner. The Resource Set also supports the notion of "secondary keys" for XML artifacts. Consider the containment of component descriptors, within the descriptors you have the ability to define a set of "categories" for the component. There may be a requirement that someone would like to find all components that have a specific category, so that they can be displayed together. The ability to define secondary keys within the Resource Set allows this. You can define as many secondary keys as needed for a particular directory. It is assumed that the types of items contained within a particular directory are of like types. The designation of the secondary key is based on Xpath expressions, and can specify either an XML element or attribute. Here is an example of the definition for the component directory.

```
<directory name="portal-component" active=
    "$Portal_Installed$">
        <search key="category" valuebased="true"
            xpath="/portal-
component/categories/category" active="true" />
        <search key="clazz" valuebased="true"
            xpath="/portal-component/class-
name" active="true" />
    </directory>
```

The definition for the directory of "portal-component" defines two secondary keys, and the implicit definition of the primary key. This processing or indexing will only occur if the variable of $Portal_Installed$ is true. By specifying which subsystems are installed we can minimize the amount of processing that the Resource Set must perform during instantiation. The two secondary keys for the "portal-component" directory are stored under the identifier of "category" and "clazz". The key indicates the logical name of the grouping so that the Xpath definition can change over time, but the internal structure will always be known by the same secondary key identifier. The "valuebased" attribute tells the Resource Set if it should consider the secondary key as absolute, or just as a membership identifier. For example, if you only wanted to know which components had an element of <foo>, but did not care what the actual value of the <foo> element was, then you would use "valuebased=false". In another example,

```
<directory name="portal-style" active=
    "$Portal_Installed$">
        <search key="category" valuebased="true"
            xpath="/portal-
style/categories/category" active="true" />
        <search key="portal-style" valuebased="false"
            xpath="/portal-style"
active="true" />
    </directory>
``` the "portal-style" directory can be queried to ask, show me all xml artifacts that have a "portal-style" element, but I don't care what the actual value of the element is. The xpath attribute of the <search> element defines the xpath to either an element or an attribute. The Resource Set processor determines if it is an element or attribute xpath by inspecting the string and determining if the syntax of the string represents an element or an attribute. If the active attribute of the <directory> element is false, then all search elements are ignored.

Dynamic Loading—Vulturing

A Resource Set can be configured to dynamically load resources from disk as well as from a deployed WAR ("hot loading"). Configuration settings specify where to look for updated versions of resources. A resource vulture keeps watch on the directory locations and determines when new classes and resources are available to be loaded.

The Resource Set supports dynamic loading of resources and classes within a resource set. Dynamic loading speeds development, because you can test changes in the resource set without having to deploy the whole EAR. You can also allow controlled changes in a production application by enabling dynamic loading for particular resource types, such as rules.

When dynamic loading is enabled, resource set vultures watch disk locations for changes. After a specified interval, if a file has changed, the vulture fires an event with information about the changed resource item. Listeners for that resource set can examine the resource item and determine what action to take. Default listeners are programmed to flush the changed object from the resource set cache, so that the new version will be loaded when it is first requested.

The Resource Set can dynamically load resources or classes or both. Settings in resourceset.xml determine what gets loaded. Each disk location has its own vulture settings.

How Vultures Work

In resourceset.xml, if the vultures element in the settings section is set to true, and if an entry in the resourcePath or libPath section specifies a disk location whose vulture interval is greater than zero, then a vulture watches that disk directory. When the vulture interval is reached the vulture checks to see if any of the files within the directory have been modified. The vulture also checks for new files. Deleted files are not processed.

When the vulture finds a changed file in the disk location, it flushes the previous instance of the file, and the new version is loaded next time the object is requested. Once an item has been loaded into the cache, it is not removed until the next time the server is started, or the next time the WAR is deployed.

Dynamic Loading and the Classloader

The Java classloader supersedes the dynamic loading of resources and classes. So if the EAR contains a class, that class will never be dynamically loaded from disk. To load classes from disk, make sure that they are not included in the deployed archive.

Example

To dynamically load pages, components, and styles from disk (e.g., C drive), first the XML files are stored in a directory called, e.g. WorkbenchProjects\MyEAR\MyApp\data, on the C drive. The Java classes for the components are compiled to WorkbenchProjects\MyEAR\MyApp\build\resource-classes.

To dynamically load updated versions of resources (pages, component descriptors, styles), the data directory is added to the resourcePath section of the resourceset.xml file. For classes, the build directory is added to the libpath. The resource JAR project may be disabled so it is omitted from the archive (only necessary to dynamically load classes).

For each path entry, the vulture interval attribute is set to indicate how often the vulture checks the disk locations for changes. The vulture interval is expressed in milliseconds.

These exemplary XML excerpts appear in resourceset.xml:

```
<resourceset>
<settings>
    <name>ResourceSet</name>
    <dynamicClassLoading>true</dynamicClassLoading>
    ...
    <vultures>true</vultures>
</settings>
<path-entries>
    <resourcePath>
        ...
        <entries>
        ...
            <entry active="true" vultureInterval="$FREQUENT$"
                recursive="true">$WARLOCATION$/data</entry>
        </entries>
    </resourcePath>
    <libPath>
        ...
        <entries>
        ...
            <entry active="true" vultureInterval="$FREQUENT$"
                recursive="true">$WARLOCATION$/build/resource-
                classes</entry>
        </entries>
    </libPath>
</path-entries>
...
</resourceset>
```

Events

Using Events to Report Resource Set Changes

As described herein, a resource set holds its resources and classes in JARs and on disk. These locations are listed in resourceset.xml in the resourcePath and libPath sections. The contents of a resource set can change when files are added or removed from the disk locations. To recognize and act on changes, Resource Set vultures are configured.

When a vulture notes a change, it fires an UPDATE event. External subsystems can listen for resource set events and react appropriately.

This section describes how to configure an event listener and what to do to handle the event.

How to Configure an Event Listener

Binding

Currently, a subsystem is bound to one resource set in a one-to-one relationship.

Any event listener that is registered for a subsystem gets events for the resource set bound to the subsystem. The registered event listener's statechanged( ) method is called when there are changes made to that resource set.

Adding a Listener

There are two ways to add an event listener for a resource set: 1) Configure a listener service in a subsystem's services.xml. The listener is registered during the boot process; or 2) Call the addStateChangeListener( ) method of EboResource to register a listener.

The listener is a class that implements com.sssw.fw.util.EbiStateChangeListener.

Adding a Listener During Startup

To register a listener during startup, a service element is included in the services.xml file for the subsystem. For example, the following XML code registers the default listener for the RULE subsystem:

```
<service>
    <interface>com.sssw.re.core.EboResourceListener</interface>
    <impl-class>com.sssw.re.core.EboResourceListener</impl-class>
    <description>RuleService ResourceSet Listener</description>
    <max-instances>1</max-instances>
    <startup>A</startup>
</service>
```

The "impl-class" element specifies the listener class that implements the methods of EbiStateChangeListener. For a listener service, the interface is typically the same as the class.

The "startup" element is set to autostart (i.e., "A") indicating it will be registered during the boot process.

Timing Issues During Startup

During the boot process, the target object may not be instantiated when a registration request occurs—so the Resource Set uses a delayed registration procedure that records the registration request and registers the listener after the target resource set is instantiated. When the registration occurs, a stateChanged event is fired with a status of EboState.REGISTER.

Adding or Removing a Listener

To add a listener in the application code, the static method addStateChangeListener( ) of com.sssw.fw.resource.EboResource is called. The arguments include 1) the name of the resource set and 2) the listener class that implements com.sssw.fw.util.EbiStateChangeListener For example, the following line of code adds the current class as a listener for the MyResources Resource Set:

EboResource.addStateChangeListener("MyResources", this);

To remove a listener, the removeStateChangeListener( ) method is called. The following line of code removes the current class as a listener for the MyResources resource set:

EboResource.removeStateChangeListener("MyResources", this);

If the class you specify is not a registered listener, the remove request is ignored.

Types of Events

Resource set events are statechanged events, reporting changes in the status of the resource set. Status codes for the various states are defined in com.sssw.fw.util.EboState. A resource set generates two types of events:

1) EboState.REGISTERED, which reports when the event listener is registered; and 2) EboState.UPDATE, which reports when a change happens in one of the watched disk locations in the resource set.

An EboResourceEvent object is passed to the statechanged event. The object consists of the resource element that changed and a EboState status code.

Firing an Event

A stateChanged event may be fired to all of a resource set's listeners. The event can use user-defined application-specific status codes or the EboState codes. The following sample code illustrates how to prepare for and fire an event. In this example, the resource set is named MyResources:

EboResource rs=EboResource.getLoaded(name);

EboResourceElement rsrcElem=rs.findResourceElement (file);

EboResourceEvent rsrcEvt=new EboResourceEvent(rsrcElem, MYSTATUSCODE);

EboResource.fireStateChanged("MyResources", rsrcEvt);

Behavior of the Standard Listeners

Each subsystem that uses resources has a standard listener that responds to changes in resource sets. The services.xml file for the subsystem sets up the registration of the listener.

If the resource set's vultures are turned on, and a vulture notes that a change has occurred in a disk location, then the vulture fires the listener's stateChanged event and passes an EboResourceEvent object containing a reference to the changed object. The listener code finds out if the changed object is relevant to that subsystem—and if so, flushes the old version of the resource from the subsystem's internal cache.

Writing a Listener

A listener class must implement the class com.sssw.fw.resource.EboResourceListener. Its only method is statechanged( ) with an argument of type EboResourceEvent. The following sample code checks for this, then gets the resource element from the event object and takes some appropriate action.

The stateChanged method might look like this:

```
public void stateChanged(EboEvent eo)
{
    if (eo instanceof EboResourceEvent)
    {
        EboResourceEvent evt = (EboResourceEvent) eo;
        if (evt.getState( ) = = EboState.REGISTERED)
        {
            ... // code to respond to getting registered, if any
        }
        if (evt.getState( ) = = EboState.UPDATE)
        {
```

-continued

```
            EboResourceElement elem = evt.getResourceElement( );
            if (elem != null )
            {
                if (elem.getDirectoryName( ).startsWith("rule"))
                {
                    ... // do something for a rule resource element
                }
            }
        }
    }
}
```

Resource Set Validation

To provide for a granular validation mechanism that can be extended and customized, the Resource Set supports the notion of validaters, and of validation.

A validater is a class that is contained within the Resource Set that implements the com.sssw.fw.resource.EbiValidater interface. If the <validate> setting is true, then the Resource Set will discover what classes or validaters are contained within the Resource Set. Once discovered, these validaters are called in no specific order.

The com.sssw.fw.resource.EbiValidater interface is defined as:

package com.sssw.fw.resource;

```
public interface EbiValidater {
    public void validate( com.sssw.fw.resource.EboResource
        resource ) throws
    Exception;
}
```

If a validater throws an Exception, the Resource Set will display a stack Trace on the console, and then proceed with the next validater. An exception within the validation process does not stop or indicate any other type of behavior modification within the Resource Set. Validaters are the last potential step during the creation and instantiation of a Resource Set.

All subsystems that potentially rely on the Resource Set for artifact storage should implement a validater. The default validater provided for a Resource Set is com.sssw.fw.resource.EboValidater. It will perform the following types of validations:

1) ValidateResourcePath—assure that all items specified on the resourcePath exist.

2) ValidateLibPath—assure that all items specified on the libPath exist.

3) ValidateComponents—assures that all component descriptors reference classes that CAN be found.

Resource Set Load Orders

The ResourceSetMeta loads the associated xml descriptor in the following sequence: 1) Variables, 2) Settings, 3) resourcePath Extensions 4) resourcePath Entries. 5) libPath Extensions, 6) libPath Entries, and 7) Directories Directives What follows is an exemplary listing of a typical Resource Set descriptor. Generally, the definition of all possible subsystems and definitions will be included and are made available or active by the use of the various "*_Installed" variables (where *=Subsystem identifier).

```xml
<!DOCTYPE resourceset PUBLIC "-//SilverStream Software, Inc.//DTD
Resource Set XML 4.0//EN" "resourceset_4_0.dtd">
<resourceset>
    <variables>
        <variable key="EARLOCATION" value="C:\J2EE_Projects\xflow" />
        <variable key="WARLOCATION" value="C:\J2EE_Projects\xflow\Portal" />
        <variable key="ACCESS_DISK" value="true" />
        <variable key="LIBRARY" value="../library" />
        <variable key="WEBINF" value="WEB-INF/lib" />
        <variable key="NEVER" value="0" />
        <variable key="FREQUENT" value="7500" />
        <variable key="INFREQUENT" value="15000" />
    </variables>
    <settings>
        <name>Portal-ResourceSet</name>
        <dynamicClassLoading>true</dynamicClassLoading>
        <validate>false</validate>
        <verbose>false</verbose>
        <vultures>true</vultures>
    </settings>
    <path-entries>
        <resourcePath>
            <filters>
                <filter active="true">build</filter>
                <filter active="true">-components</filter>
                <filter active="true">org/</filter>
            </filters>
            <exts>
                <ext active="true">.xml</ext>
                <ext active="true">.dtd</ext>
                <ext active="true">.xsl</ext>
                <ext active="true">.html</ext>
                <ext active="true">.htm</ext>
                <ext active="true">.js</ext>
                <ext active="true">.txt</ext>
                <ext active="true">.css</ext>
                <ext active="true">.jpg</ext>
                <ext active="true">.jpeg</ext>
                <ext active="true">.gif</ext>
                <ext active="true">.png</ext>
                <ext active="true">.properties</ext>
                <ext active="true">.sql</ext>
                <ext active="$ACCESS_DISK$">.java</ext>
            </exts>
            <entries>
                <entry active="true">$WEBINF$/WorkflowRE.jar</entry>
                active="true">$WEBINF$/workflow_components.jar</entry>
                <entry active="true">$WEBINF$/WorkflowUI.jar</entry>
                <entry active="true">$WEBINF$/WorkflowAL.jar</entry>
                <entry active="true">$WEBINF$/RuleCA.jar</entry>
                <entry active="true">$WEBINF$/rule_components.jar</entry>
                <entry active="true">$WEBINF$/analyzers_views.jar</entry>
                <entry active="true">$WEBINF$/PortalCA.jar</entry>
                <entry active="true">$WEBINF$/general_components.jar</entry>
                <entry active="true">$WEBINF$/portal_core_resource.jar</entry>
                <entry active="!$ACCESS_DISK$">$WEBINF$/Portal_resource.jar</entry>
                <entry active="false" vultureInterval="$FREQUENTS$" recursive="true">$WARLOCATION$/WEB-INF/lib</entry>
                <entry active="$ACCESS_DISK$" vultureInterval="$FREQUENTS$" recursive="true">$WARLOCATION$/data</entry>
                <entry active="$ACCESS_DISK$" vultureInterval="$FREQUENTS$" recursive="true">$WARLOCATION$/src</entry>
                <entry active="true">WEB-INF/lib/ImportView.jar</entry>
                <entry active="true">WEB-INF/lib/EditResourceElement.jar</entry>
                <entry active="true">WEB-INF/lib/GetResourceElementInfo.jar</entry>
            </entries>
        </resourcePath>
        <libPath>
            <filters>
                <filter active="true">org/</filter>
                <filter active="true">com/sssw/fw</filter>
```

-continued

```xml
            <filter active="true">com/sssw/portal/api</filter>
            <filter active="true">com/sssw/portal/factory</filter>
            <filter active="true">com/sssw/portal/core</filter>
        </filters>
        <exts>
            <ext active="true">.class</ext>
        </exts>
        <entries>
            <entry active="true">$WEBINF$/WorkflowRE.jar</entry>
            <entry active="true">$WEBINF$/workflow_components.jar</entry>
            <entry active="true">$WEBINF$/WorkflowUI.jar</entry>
            <entry active="true">$WEBINF$/WorkflowAL.jar</entry>
            <entry active="true">$WEBINF$/RuleCA.jar</entry>
            <entry active="true">$ WEBINF$/rule_components.jar</entry>
            <entry active="true">$WEBINF$/analyzers_views.jar</entry>
            <entry active="true">$ WEBINF$/PortalCA.jar</entry>
            <entry active="true">$WEBINF$/general_components.jar</entry>
            <entry active="true">$WEBINF$/portal_core_resource.jar</entry>
            <entry active="!$ACCESS_DISK$">$WEBINF$/Portal_resource.jar</entry>
            <entry active="false" vultureInterval="$FREQUENT$" recursive="true">$WARLOCATION$/WEB-INF/lib</entry>
            <entry active="$ACCESS_DISK$" vultureInterval="$FREQUENT$" recursive="true">$WARLOCATION$/build/Portal-resource-classes</entry>
            <entryactive="true">WEB-INF/lib/ImportView.jar</entry>
            <entry active="true">WEB-INF/lib/EditResourceElement.jar</entry>
            <entry active="true">WEB-INF/lib/GetResourceElementInfo.jar</entry>
        </entries>
    </libPath>
</path-entries>
<directories>
    <directory name="framework-database" active="true">
        <search key="framework-database" valuebased="false" xpath="/framework-database" active="true" />
    </directory>
    <directory name="images" active="true" />
    <directory name="my-views" active="true" />
    <directory name="portal-category" active="true">
        <search key="category-type" valuebased="true" xpath="/portal-category/category-type" active="true" />
    </directory>
    <directory name="portal-component" active="true">
        <search key="category" valuebased="true" xpath="/portal-component/categories/category" active="true" />
        <search key="clazz" valuebased="true" xpath="/portal-component/class-name" active="true" />
    </directory>
    <directory name="portal-data-definition" active="true" />
    <directory name="portal-device-profile" active="true" />
    <directory name="portal-layout" active="true">
        <search key="portal-layout" valuebased="false" xpath="/portal-layout" active="true" />
    </directory>
    <directory name="portal-option" active="true">
        <search key="portal-option" valuebased="false" xpath="/portal-option" active="true" />
    </directory>
    <directory name="portal-page" active="true">
        <search key="category" valuebased="true" xpath="/portal-page/categories/category" active="true" />
        <search key="portal-page" valuebased="false" xpath="/portal-page" active="true" />
    </directory>
    <directory name="portal-style" active="true">
        <search key="category" valuebased="true" xpath="/portal-style/categories/category" active="true" />
        <search key="portal-style" valuebased="false" xpath="/portal-style" active="true" />
        <search key="name" valuebased="true" xpath="/portal-style/display-name" active="true" />
    </directory>
    <directory name="portal-theme" active="true" />
    <directory name="rule" active="true">
        <search key="name" valuebased="true" xpath="/rule[@name]"
```

-continued

```
active="true" />
        </directory>
        <directory name="rule-action-macro" active="true">
            <search key="name" valuebased="true" xpath="/actionmacro[@name]"
active="true" />
        </directory>
        <directory name="rule-condition-macro" active="true">
            <search key="name" valuebased="true"
xpath="/conditionmacro[@name]" active="true" />
        </directory>
        <directory name="rule-group-binding" active="true">
            <search key="name" valuebased="true" xpath="//group[@id]"
active="true" />
        </directory>
        <directory name="rule-pipeline" active="true">
            <search key="name" valuebased="true" xpath="/pipeline[@name]"
active="true" />
        </directory>
        <directory name="rule-pipeline-binding" active="true">
            <search key="name" valuebased="true" xpath="//pipeline[@id]"
active="true" />
        </directory>
        <directory name="rule-user-binding" active="true">
            <search key="name" valuebased="true" xpath="//user[@id]" active="true"
/>
        </directory>
        <directory name="security-role" active="true" />
        <directory name="workflow-activity-policy" active="true">
            <search key="name" valuebased="true"
xpath="/activitypolicy/activity[@name]" active="true" />
            <search key="type" valuebased="true"
xpath="/activitypolicy/activity/client[@type]" active="true" />
            <search key="uri" valuebased="true"
xpath="/activitypolicy/activity/client[@uri]" active="true" />
        </directory>
        <directory name="workflow-process" active="true">
            <search key="id" valuebased="true" xpath="/process[@id]" active="true"
/>
            <search key="name" valuebased="true" xpath="/process[@name]"
active="true" />
        </directory>
    </directories>
</resourceset>
```

Advantages of the Present Solution

As disclosed herein, the advantages of the present solution is readily appreciated, one such advantage being that the present solution enables, for example, a developer utilizing the same to construct and update enterprise applications in an increasingly efficient manner.

CONCLUSION

Having now described a preferred embodiment of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents or similar purpose, unless expressly stated otherwise. Therefore, numerous other embodiments of the modifications thereof are contemplated as falling within the scope of the present invention as defined by the appended claims and equivalents thereto.

Moreover, the techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device and one or more output devices. Program code is applied to data entered using the input device to perform the functions described and to generate output information. The output information is applied to one or more output devices.

Each program is preferably implemented in a high level procedural or object oriented programming language to communicate with a computer system, however, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

What is claimed is:

1. In a system comprising a source device from which application resources associated with an application are transmitted to a target device to run the application on the target device, a method for dynamically loading application resources associated with an application resource set from the source device to the target device, the method comprising:

configuring the application resource set to dynamically load one or more application resources associated with the application, wherein configuring the application resource set includes defining one or more settings to specify one or more types for the one or more application resources associated with the application to be dynamically loaded;

registering one or more event listeners for a subsystem bound to the configured application resource set;

identifying, at the source device, the one or more application resources associated with the application for which dynamic loading is configured based on at least the specified one or more types, wherein the identified application resources have at least one of the one or more types specified in the defined settings;

determining that one or more of the identified application resources have been modified in a monitored memory location associated with the identified application resources at the source device; and dynamically loading the one or more modified application resources from the source device to the target device based on the defined settings, wherein dynamically loading the one or more modified application resources from the source device to the target device includes:

generating an event in response to determining that the one or more of the identified application resources have been modified in the monitored memory location associated with the identified application resources at the source device; and dispatching the generated event to the registered event listeners, wherein the registered event listeners examine the dispatched event in view of the defined settings to determine whether to dynamically load the one or more modified application resources from the source device to the target device.

2. The method of claim 1, wherein the determining occurs in response to determining that a predefined time interval has expired.

3. The method of claim 2, wherein the settings define the predefined time interval for determining whether the one or more application resources have been modified at the source device.

4. The method of claim 1, wherein said application resources include data files.

5. The method of claim 1, wherein said application resources include one or more of categories, components, data, data definitions, device profiles, style sheets, classes, rules, custom conditions, actions, security roles, or workflow processes.

6. The method of claim 1, wherein the application comprises a Java application.

7. The method of claim 1, wherein the determining further includes determining that the one or more of the identified application resources have been modified in response to determining that the memory location includes at least one new or modified application resource associated with the application.

8. The method of claim 1, wherein the settings define whether and when the application resource set reports that the one or more application resources have been modified at the source device.

9. The method of claim 1, wherein the settings define the memory location associated with the identified application resources.

10. A network system for dynamically loading application resources associated with an application resource set from a source device to a target device to run an application associated with the application resources on the target device, the system comprising a computer configured to:

configure the application resource set to dynamically load one or more application resources associated with the application, wherein configuring the application resource set includes defining one or more settings to specify one or more types for the one or more application resources associated with the application to be dynamically loaded;

register one or more event listeners for a subsystem bound to the configured application resource set;

identify, at the source device, the one or more application resources associated with the application for which dynamic loading is configured based on at least the specified one or more types, wherein the identified application resources have at least one of the one or more types specified in the defined settings;

determine that one or more of the identified application resources have been modified in a monitored memory location associated with the identified application resources at the source device; and dynamically load the one or more modified application resources from the source device to the target device based on the defined settings, wherein to dynamically load the one or more modified application resources from the source device to the target device, the computer is further configured to:

generate an event in response to determining that the one or more of the identified application resources have been modified in the monitored memory location associated with the identified application resources at the source device; and dispatch the generated event to the registered event listeners, wherein the registered event listeners examine the dispatched event in view of the defined settings to determine whether to dynamically load the one or more modified application resources from the source device to the target device.

11. The system of claim 10, wherein the determining occurs in response to determining that a predefined time interval has expired.

12. The system of claim 11, wherein the settings define the predefined time interval for determining whether the one or more application resources have been modified at the source device.

13. The system of claim 10, wherein said application resources include data files.

14. The system of claim 10, wherein said application resources include one or more of categories, components, data, data definitions, device profiles, style sheets, classes, rules, custom conditions, actions, security roles, or workflow processes.

15. The system of claim 10, wherein the application comprises a Java application.

16. The system of claim 10, wherein the determining further includes determining that the one or more of the identified application resources have been modified in response to determining that the memory location includes at least one new or modified application resource associated with the application.

17. The system of claim 10, wherein the settings define whether and when the application resource set reports that the one or more application resources have been modified at the source device.

18. The system of claim 10, wherein the settings define the memory location associated with the identified application resources.

19. A computer readable storage medium having computer readable program code embodied therein for dynamically loading application resources associated with an application resource set from a source device to a target device to run an application associated with the application resources on the target device, wherein a computer that executes the computer readable program code is configured to:
- configure the application resource set to dynamically load one or more application resources associated with the application, wherein configuring the application resource set includes defining one or more settings to specify one or more types for the one or more application resources associated with the application to be dynamically loaded;
- register one or more event listeners for a subsystem bound to the configured application resource set;
- identify, at the source device, the one or more application resources associated with the application for which dynamic loading is configured based on at least the specified one or more types, wherein the identified application resources have at least one of the one or more types specified in the defined settings;
- determine that one or more of the identified application resources have been modified in a monitored memory location associated with the identified application resources at the source device; and
- dynamically load the one or more modified application resources from the source device to the target device based on the defined settings, wherein to dynamically load the one or more modified application resources from the source device to the target device, the computer is further configured to:
- generate an event in response to determining that the one or more of the identified application resources have been modified in the monitored memory location associated with the identified application resources at the source device; and
- dispatch the generated event to the registered event listeners, wherein the registered event listeners examine the dispatched event in view of the defined settings to determine whether to dynamically load the one or more modified application resources from the source device to the target device.

20. The computer readable storage medium of claim 19, wherein the determining occurs in response to determining that a predefined time interval has expired.

21. The computer readable storage medium of claim 20, wherein the settings define the predefined time interval for determining whether the one or more application resources have been modified at the source device.

22. The computer readable storage medium of claim 19, wherein said application resources include data files.

23. The computer readable storage medium of claim 19, wherein said application resources include one or more of categories, components, data, data definitions, device profiles, style sheets, classes, rules, custom conditions, actions, security roles, or workflow processes.

24. The computer readable storage medium of claim 19, wherein the application comprises a Java application.

25. The computer readable storage medium of claim 19, wherein the determining further includes determining that the one or more of the identified application resources have been modified in response to determining that the memory location includes at least one new or modified application resource associated with the application.

26. The computer readable storage medium of claim 19, wherein the settings define whether and when the application resource set reports that the one or more application resources have been modified at the source device.

27. The computer readable storage medium of claim 19, wherein the settings define the memory location associated with the identified application resources.

* * * * *

UNITED STATES PATENT AND TRADEMARK OFFICE
CERTIFICATE OF CORRECTION

PATENT NO.       : 7,765,551 B2
APPLICATION NO.  : 10/361264
DATED            : July 27, 2010
INVENTOR(S)      : Jeffrey Broberg Page 1 of 1

It is certified that error appears in the above-identified patent and that said Letters Patent is hereby corrected as shown below:

On the title page, change Item (54) to read:

--SYSTEM AND METHOD FOR DYNAMICALLY LOADING APPLICATION RESOURCES FROM A SOURCE DEVICE TO A TARGET DEVICE BASED ON MODIFICATIONS TO THE APPLICATION RESOURCES AT THE SOURCE DEVICE--.

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,765,551 B2  Page 1 of 1
APPLICATION NO. : 10/361264
DATED : July 27, 2010
INVENTOR(S) : Jeffrey Broberg It is certified that error appears in the above-identified patent and that said Letters Patent is hereby corrected as shown below:

On the title page, change Item (54) and at Column 1, lines 1-5, title to read:

--SYSTEM AND METHOD FOR DYNAMICALLY LOADING APPLICATION RESOURCES FROM A SOURCE DEVICE TO A TARGET DEVICE BASED ON MODIFICATIONS TO THE APPLICATION RESOURCES AT THE SOURCE DEVICE--.

This certificate supersedes the Certificate of Correction issued September 28, 2010.

Signed and Sealed this

Ninth Day of November, 2010

David J. Kappos
*Director of the United States Patent and Trademark Office*